B. Baker. Seed Planter.

117502

PATENTED AUG 1 1871

Witnesses:
E. Wolff
Frank Stockley

Inventor:
B. Baker
PER Munn & Co
Attorneys.

AM. PHOTO-LITHOGRAPHIC CO. N.Y. (OSBORNES PROCESS.)

No. 117,502

UNITED STATES PATENT OFFICE.

BARNEY BAKER, OF HOPKINTON, IOWA.

IMPROVEMENT IN SEED-PLANTERS.

Specification forming part of Letters Patent No. 117,502, dated August 1, 1871.

*To all whom it may concern:*

Be it known that I, BARNEY BAKER, of Hopkinton, in the county of Delaware and State of Iowa, have invented a new and Improved Seed-Planter; and I do hereby declare that the following is a full, clear, and exact description thereof, which will enable others skilled in the art to make and use the same, reference being had to the accompanying drawing forming part of this specification, in which—

Figure 1:
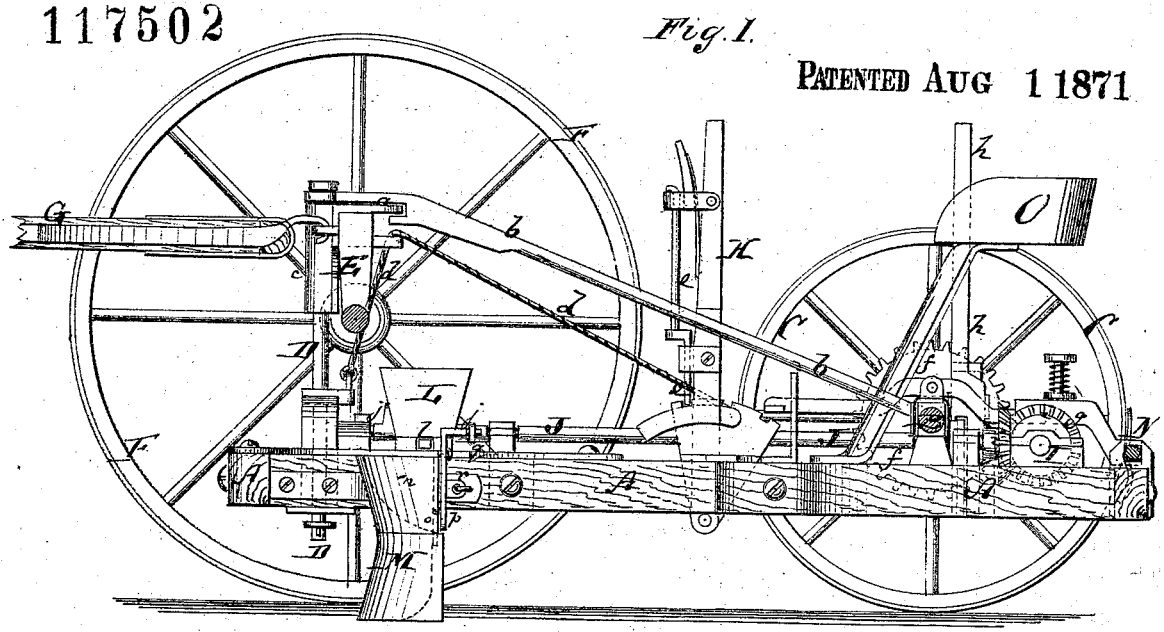
Figure 2:
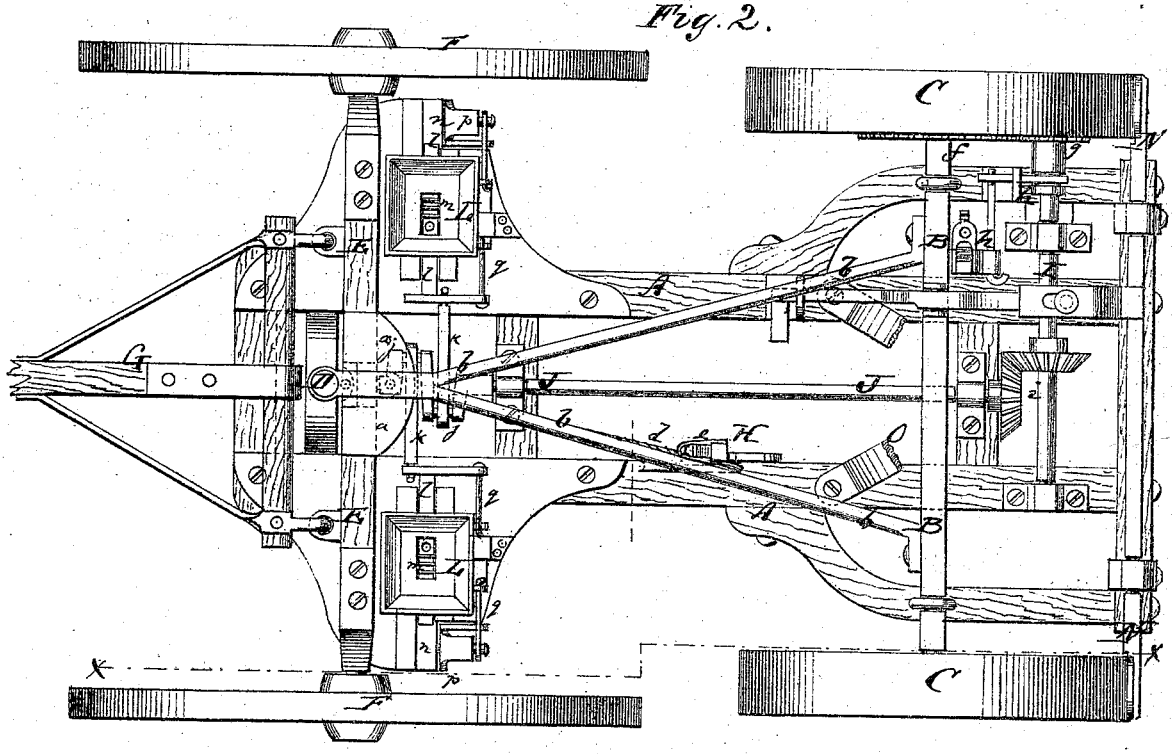
Figure 3:
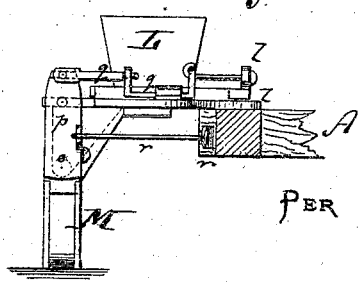

Figure 1 represents a side elevation, partly in section, of my improved seed-planter, $x\ x$, Fig. 2, being the section-line. Fig. 2 is a plan or top view of the same. Fig. 3 is a detail rear view of the seed-drop.

Similar letters of reference indicate corresponding parts.

This invention relates to a new machine for planting corn or other seed in hills that are suitable distances apart; and consists in a novel gearing mechanism and dropping device, whereby the distribution of the seed remains under perfect control, as hereinafter more fully described.

A in the drawing represents the frame of my improved seed-planter. This frame is made of oblong shape, of wood or other suitable material, and has its rear end supported by or suspended from an axle, B, that rests on wheels C C. The front end of the frame A is, by a king-bolt, D, connected with a yoke-shaped axle, E, which rests on large front wheels F F. The axle E carries a fifth-wheel, $a$, which works in the front part of converging braces $b\ b$, that project from the rear axle B. The king-bolt D passes through the front end of the brace $b$ and through a tube, $c$, formed on the fifth-wheel, that is affixed to the front axle. Draft is applied to the front axle by the application thereto of the tongue G, or in other suitable manner. The front end of the frame A is connected, by a rope or chain, $d$, with a lever, H, which is pivoted to the rear part of the said frame, the rope passing over a roller hung to the front axle. In this manner the front part of the frame A is suspended from the front axle, and can be raised or lowered, by means of the lever H, to let the furrow-opener work at suitable depth and to raise the same clear of the ground while turning furrows or conveying the machine to and from the field. The lever H has a suitable catch, $e$, by means of which it can be locked in every desired position to hold the front end of the frame A at suitable height. One of the wheels C carries a toothed wheel, $f$, meshing into a smaller toothed wheel, $g$, which is arranged on a transverse shaft, I, hung in the rear part of the frame A. The wheel $g$ can, by means of a clutch and lever, $h$, be readily thrown into and out of gear. J is a longitudinal shaft hung in the middle of the frame A and extending nearly from end to end of the same. Bevel-wheels $i\ i$ connect the shafts I J so that the latter receives rotary motion from the driving-wheel C. The shaft J has near its front end two cranks, $j\ j$, which project in opposite directions. These cranks are, by rods $k\ k$, connected with the perforated seed-slides $l\ l$, respectively. These slides are, by the rotary motion of the shaft J, moved back and forth to transfer the seed from the hoppers to the seed-drops. Each seed-slide $l$ constitutes the bottom of a hopper, L. The lower opening of said hopper is provided with cross-wires $m\ m$, which serve to keep the seed properly apart and to prevent the clogging and cutting of the same. The slides $l$ convey the seed from the hoppers to chambers $n\ n$, which are closed on all sides, except in rear, where they have discharge-openings $o$. A plate, $p$, pivoted to the proper frame-work, serves to close said opening $o$ under action of a spring, $r$. The pivoted plate $p$ is, by suitable links, $q\ q$, connected with the seed-slide to be oscillated by the same.

The seed-slides convey the seed to the chambers $n$ and deposit it therein. The plates or valves $p$ are then opened to let the seed drop to the ground in rear of the furrow-openers M M, which are suspended from the frame-work. The rear wheels C C are made wide enough to serve as furrow-closers and for pressing the seed into the earth.

By varying the relative sizes of the gear-wheels the number of seed deposits to every revolution of the driving-wheel C can be varied at will. N is a brake attachment, operating in suitable manner. O is the driver's seat.

Having thus described my invention, I claim as new and desire to secure by Letters Patent—

1. The combination of the swinging frame A, which carries the furrow-openers M, with the yoke-axle E, rope d, and lever H, all arranged to operate substantially as herein shown and described.

2. The hopper L, provided with the grate-bars or rods m in the bottom, for the purpose of protecting the seed, in the manner specified.

3. The combination of the valve p with the chamber n, seed-slide l, and hopper L, all arranged to operate substantially as herein shown and described.

BARNEY BAKER.

Witnesses:
RHEINARD KAHMER,
GEORGE BAKER.